United States Patent
Chaudhari et al.

(10) Patent No.: US 7,717,792 B2
(45) Date of Patent: May 18, 2010

(54) TORSIONAL DETUNER

(75) Inventors: Dalsang Kanabhai Chaudhari, Cedar Falls, IA (US); James Albert Niebergall, Buckingham, IA (US)

(73) Assignee: Deere & Company, Moline, IL (US)

( * ) Notice: Subject to any disclaimer, the term of this patent is extended or adjusted under 35 U.S.C. 154(b) by 200 days.

(21) Appl. No.: 11/623,566

(22) Filed: Jan. 16, 2007

(65) Prior Publication Data
US 2008/0171604 A1 Jul. 17, 2008

(51) Int. Cl.
*F16D 3/79* (2006.01)
(52) U.S. Cl. .................................................. 464/99
(58) Field of Classification Search ............ 464/78, 464/98–99
See application file for complete search history.

(56) References Cited

U.S. PATENT DOCUMENTS

| | | | |
|---|---|---|---|
| 4,044,628 A * | 8/1977 | Jacks | 464/98 |
| 4,795,012 A * | 1/1989 | Durum | 464/99 |
| 5,147,246 A * | 9/1992 | Focqueur et al. | |
| 6,585,091 B2 * | 7/2003 | Reinhart et al. | 464/99 |
| 2005/0181881 A1 * | 8/2005 | Wouw | |

* cited by examiner

*Primary Examiner*—Greg Binda

(57) ABSTRACT

A torsional detuner for dampening vibrations developed in an internal combustion engine having a crankshaft, a flywheel connected to the crankshaft and a transmission assembly coupled to the flywheel. The detuner includes a planar body mounted to the flywheel and having a central hub, a peripheral rim and a plurality of elastically deformable members connecting the hub to the rim. The deformable members extend outward from the hub to the rim in an outwardly radial spiral. Advantageously, vibrations developed in the engine are dampened by the relative rotation between the hub and rim.

13 Claims, 3 Drawing Sheets

TORSIONAL DETUNER

TECHNICAL FIELD

The present invention relates to vibration control. More specifically, the invention relates to a torsional detuner or damper for use in a powertrain of a motor vehicle to dampen vibrations developed in the engine of the powertrain.

BACKGROUND

Torsional detuners or dampers have been used for many years in motor vehicles and are most often disposed between an engine, such as an internal combustion engine, and a transmission. The torsional detuners are typically connected to the flywheel of the engine and the input shaft of the transmission. A torsional detuner operates to reduce or eliminate vibrations that have developed in the crankshaft of the engine. The explosive forces acting on the pistons typically create these vibrations, which thereafter propagate through the crankshaft. At certain engine speeds, the vibration is more noticeable and can be irritating to an operator and, over time, such vibrations may damage the crankshaft itself.

Conventional vibration dampening devices employ detuners having energy storing elements. Typically, these energy storing elements are located on the periphery of the flywheel and include coil springs or a rubber member. Additional storage elements act in an axial direction, relative to the rotation of the flywheel, and cooperate with friction pads or linings to produce friction hysteresis.

While conventional vibration detuners achieve their intended purpose, problems still exist. For example, there are space constraints for packaging the torsional detuners. Further, conventional rubber detuners have a high internal hysteresis that can cause detuner failure due to heat. Moreover, the rubber used in conventional detuners becomes stiffer over time, and the increased stiffness, combined with high operating frequencies, can lead to transmission failure. In addition, it is well known that the compression spring-type detuners used today have inherent wear problems that cause premature failure.

Therefore, a need exists for a vibration detuner that is easily packaged, and withstands the heat and vibration that exists in the powertrain environment. The new improved detuner design should be highly space efficient, easily assembled to the driveline, have a low internal hysteresis and a substantially constant spring rate over time.

SUMMARY

In overcoming the above and other drawbacks and limitations of the conventional art, the present invention provides a device for dampening vibrations developed in a powertrain of a motor vehicle. The powertrain includes an internal combustion engine having a crankshaft connected to a plurality of pistons that are configured for reciprocal movement within the engine. An engine output shaft connects the crankshaft with a flywheel and the flywheel is coupled to a transmission. Through this coupling, torque developed in the engine is transferred to the transmission and to the ground engaging wheels or tracks of the motor vehicle.

In one aspect, the device of the present invention includes a planar body mounted to the flywheel. The planar body has a rim, a central hub, and a plurality of elastically deformable members connecting the rim to the central hub. The deformable members spiral radially outward from the hub to the rim. Further, a yoke is mounted to the central hub of the planar member for coupling to the input of the transmission. Through this construction, vibrations developed in the internal combustion engine are dampened by the relative rotation between the central hub and rim.

In another aspect of the present invention, the elastically deformable members are arcuate.

In yet another aspect, the elastically deformable members are formed from a plurality of steel plates.

In a further aspect of the present invention, the planar body is formed from a plurality of stacked steel plates.

In still another aspect of the present invention, planar body includes four elastically deformable members.

In one aspect of the present invention, a pair of guide pins are disposed in the planar body for aligning the planar body with the flywheel.

In another aspect, a plurality of apertures, each for receiving a fastener, are provided in the body to rotationally fix the planar body to the flywheel.

In yet another aspect of the present invention, the yoke has a plurality of apertures, each for receiving a fastener to rotationally fix the yoke to the driveline.

In a further aspect of the present invention, a powertrain is provided having an internal combustion engine, a transmission and a device disposed between the engine and the transmission for dampening vibrations developed in the engine. The engine includes a crankshaft and a flywheel connected to the crankshaft. The device itself is mounted to the flywheel and has a planar body with a peripheral rim, a central hub and a plurality of elastically deformable members connecting the peripheral rim to the central hub. A yoke is mounted to the central hub and to a driveline of the transmission assembly, whereby vibrations developed in the internal combustion engine are dampened by the relative rotation between the central hub and peripheral rim.

DESCRIPTION

Figure 1:
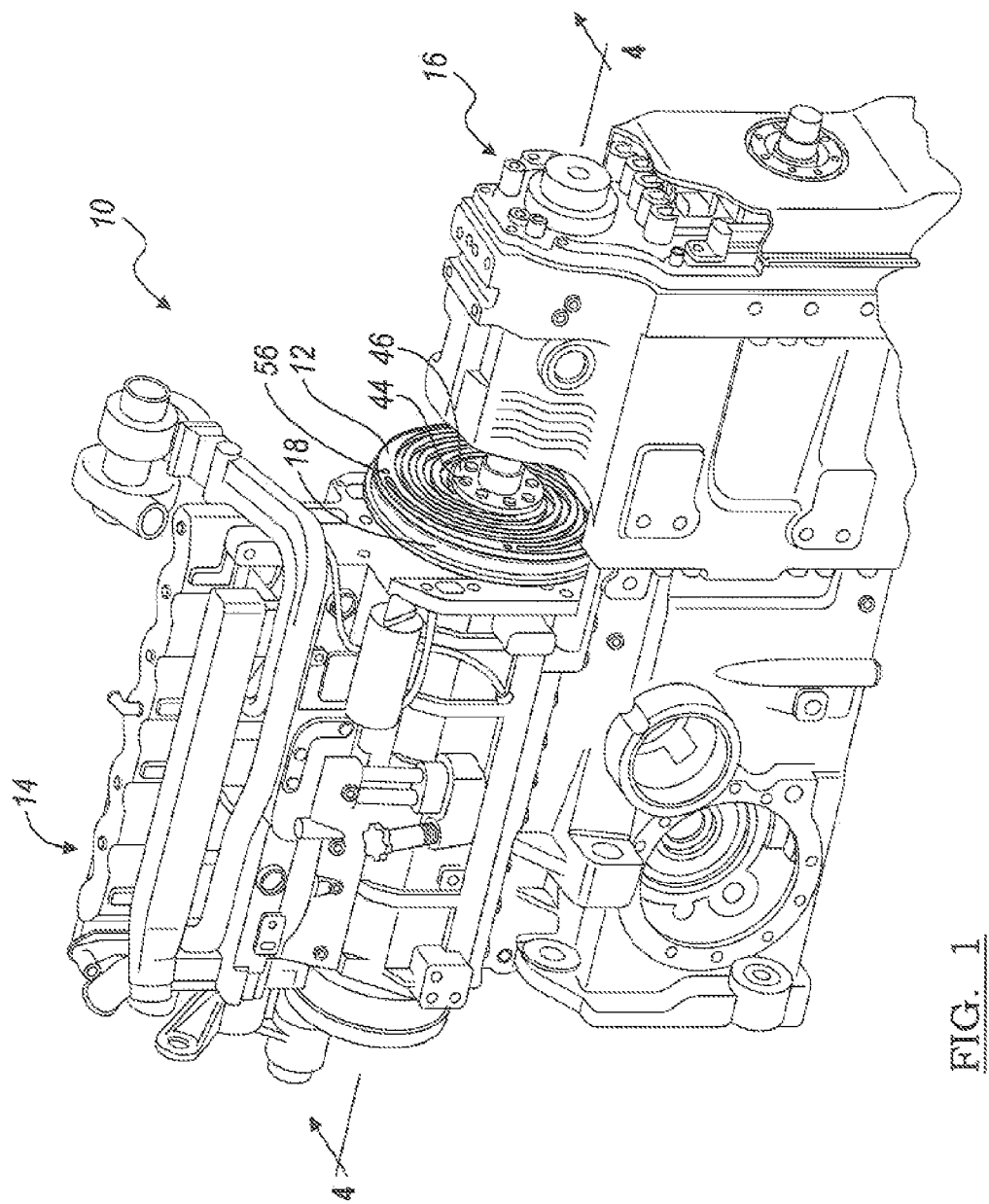
FIG. 1 is a perspective view of an engine coupled to a transmission with a torsional detuner device disposed therebetween in accordance with an embodiment of the present invention.

Referring now to FIG. 1, a perspective view of a powertrain 10 incorporating a torsional detuner device 12 is illustrated, in accordance with the principles of the present invention. The powertrain 10 generally includes an internal combustion engine 14, which may be a gas engine, a diesel engine or the like, coupled to a transmission assembly 16. Generally, the internal combustion engine 14 has a plurality of pistons that are configured for reciprocal movement within corresponding combustion cylinders. Further, a crankshaft (not shown), coupled to the pistons, as is conventionally known, is rotated in response to the reciprocal motion of the plurality of pistons. The crankshaft is further coupled to a flywheel 18 and, thus, rotates the flywheel 18. The flywheel 18 is coupled to the torsional detuner 12 and the torsional detuner 12, in turn, transfers the rotational output developed by the engine 14 and flywheel 18 to the transmission assembly 16 through a transmission input shaft 20 (seen in FIG. 4). As will be described in further detail below, the torsional detuner 12 is configured to dampen vibrations propagated in the crankshaft of the engine 14 to prevent, or greatly reduce, the transfer of these vibrations to the transmission assembly 16.

Figure 2:
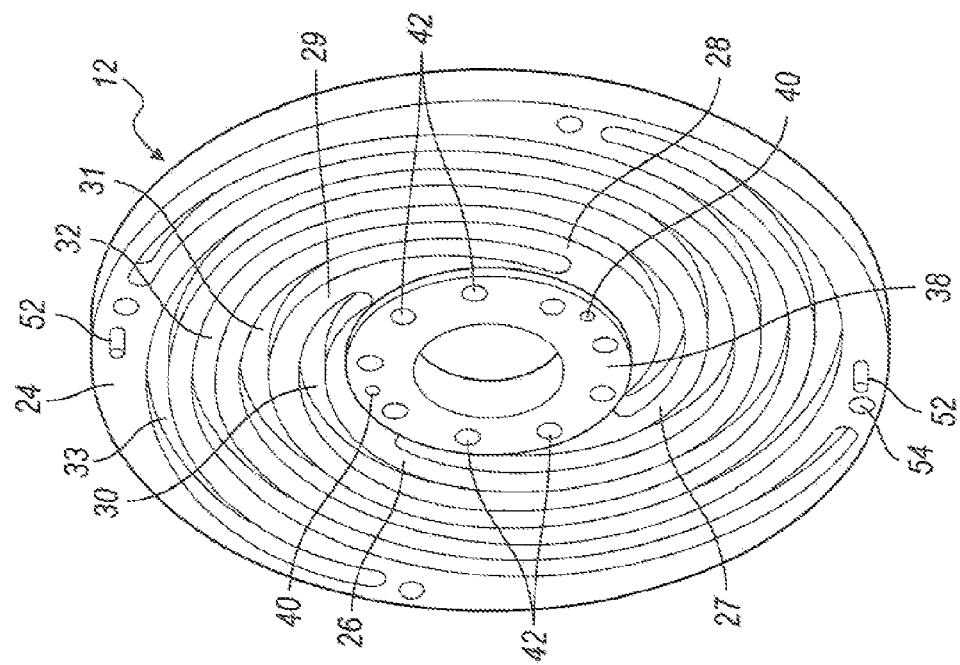
FIG. 2 is a perspective view of a first side of the torsional detuner, in accordance with an embodiment of the present invention.
Figure 3:
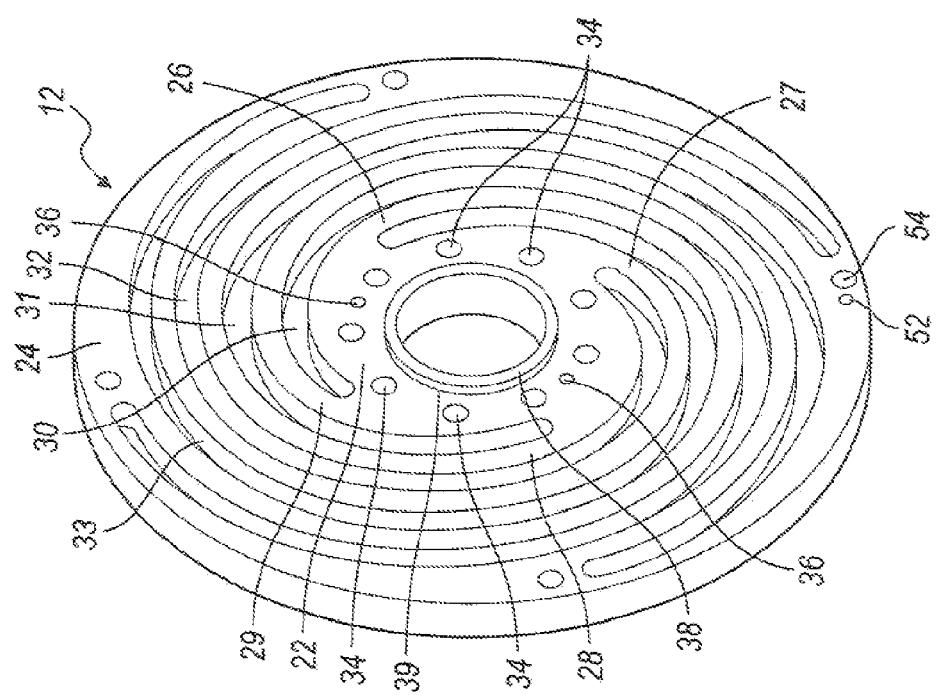
FIG. 3 is a perspective view of the opposing side of a the torsional detuner seen in FIG. 2.

Referring now to FIGS. 2 and 3, perspective views of opposing sides of the torsional detuner 12 are illustrated therein. The detuner 12 is generally a circular, planar body having a central hub 22, a peripheral rim 24 and a series of elastically deformable members 26, 27, 28, 29 connecting the hub 22 to the rim 24. In the illustrated embodiment, four members 26, 27, 28, 29 are shown, it being understood that a fewer or greater number of members could be provided. The members 26, 27, 28, 29 emanate from the hub 22 in an outwardly radial spiral configuration. Thus, between each of the members 26, 27, 28, 29 is a slot 30, 31, 32, 33 that similarly emanates in an outwardly radial spiral configuration.

The central hub 22 further includes a plurality of mounting apertures 34 (only some of which are labeled in the Figures) for mounting the torsional detuner to the transmission input shaft 20. The hub 22 additionally includes a pair of guide pin apertures 36 for aligning a yoke 38 within a central aperture 39 in the hub 22. More specifically, a pair of guide pins 40, press-fitted into the yoke 38 cooperate with the guide pin apertures 36 to align the yoke 38 such that yoke mounting apertures 42 align with the mounting apertures 34 the hub 22. Once the alignment of the mounting apertures 34 and 42 is achieved, a fastener 44, such as a screw, bolt, rivet or pin, may be passed through the yoke 38 and hub 22 of the torsional detuner 12 to mount the detuner 12 to the transmission input shaft 20. In order to mount the detuner 12 to the transmission input shaft 20, a collar 46 having one end 48 in spline engagement with the input shaft 20 and an opposing end 50 in a flanged engagement with the detuner 12 is illustrated in FIG. 4.

The torsional detuner 12 further includes flywheel alignment pins 52 that are pressed fit into apertures on the peripheral rim 24 of the torsional detuner 12. The flywheel alignment pins 52 cooperate with guide apertures (not shown) disposed in the flywheel 18 to assist in the alignment of flywheel mounting apertures 54 (not shown) disposed along the perimeter of torsional detuner 12 with mounting apertures disposed along the perimeter of the flywheel 18. Fasteners 56, such as screws, bolts, rivets, pins or similar devices extended through these mounting apertures 54 are used to fasten the torsional detuner 12 to the flywheel 18.

In a preferred embodiment, each of the members 26, 27, 28, 29 are configured to deform elastically when the detuner 12 is rotated by the flywheel 18. The elastic deformation in members 26, 27, 28, 29 as a result of relative rotational movement between the rim 24 and the central hub 22, and therefore the flywheel 18 and the transmission input shaft 20. In the illustrated embodiment, the members 26, 27, 28, 29 are unitarily formed with the central hub 22 and peripheral rim 24. However, in an alternate construction, the members may be separately formed and connected to the hub 22 and rim 24.

Figure 4:
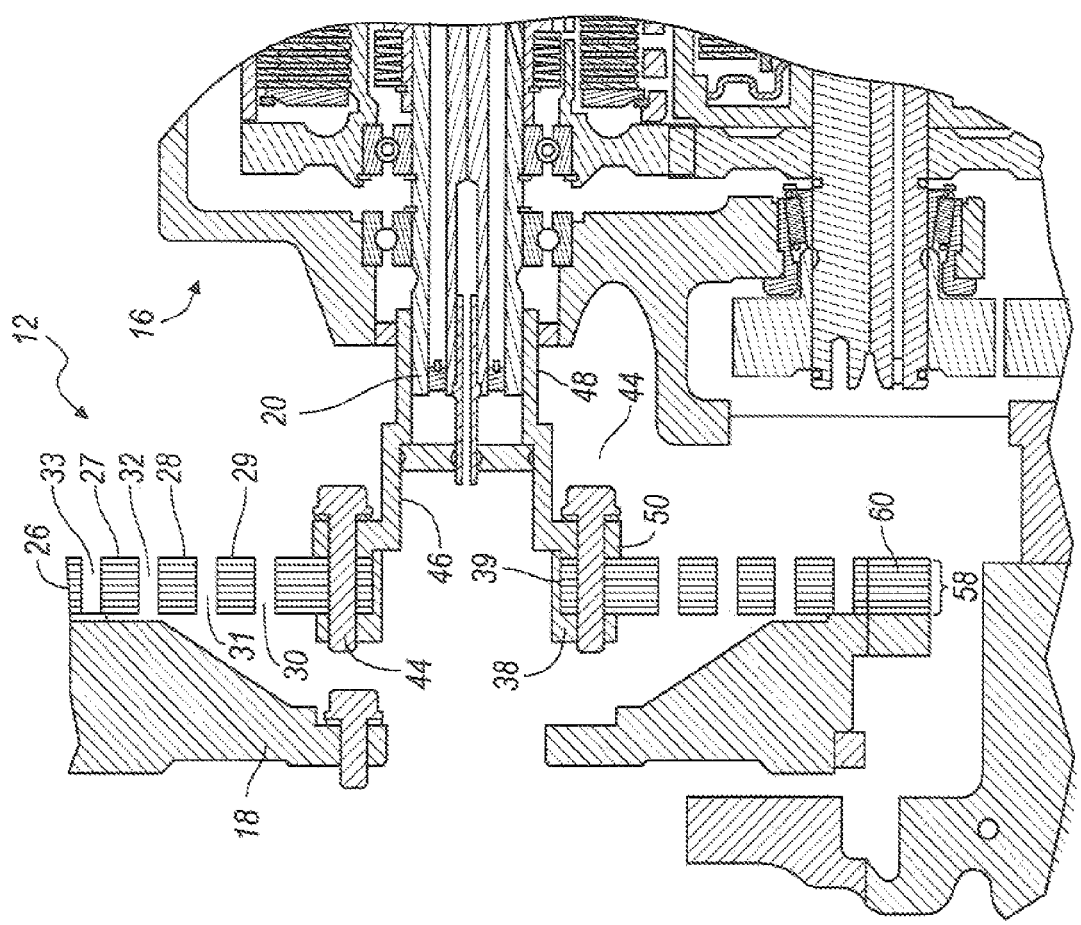
FIG. 4 is a partial cross-sectional view through the powertrain shown along line 2-2 as indicated in FIG. 1, in accordance with an embodiment of the present invention.

As shown in FIG. 4, the torsional detuner 12 is formed as a stack 58 of plates 60 disposed adjacent each other. Each of the plates 60 is similarly shaped and, when stacked adjacent each other, cooperate to define the various features (hub 22, rim 24, members 26-29, etc.) of the detuner 12. Preferably, five to fourteen plates 60 of spring steel are utilized to form the stack 58. However, the present invention contemplates a greater or lesser number of plates 60 and other materials, such as but not limited to, composites materials formed of polymers, ceramics and fibers.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A device for dampening vibrations developed in a driveline, the driveline having an engine with a crankshaft and a flywheel coupled via the device to a driven member, the device comprising:

a planar body having a central hub and a peripheral rim, a plurality of guide pins disposed in the planar body, the guide pins configured to aligning the planar body with the flywheel, a plurality of elastically deformable members extending outward from the hub and connecting the hub to the rim, the hub and the rim each having mounting portions configured such that the mounting portion of the hub is mounted to the driven member and the mounting portion of the rim is mounted to the flywheel, the mounting portion of the hub having a yoke mounted in a central aperture in the hub, the yoke being configured to connect with the driven member whereby vibrations developed in the engine are dampened by the relative rotation between the hub and rim.

2. The device of claim 1, wherein the elastically deformable members extend from the hub to the rim in an outwardly radial spiral.

3. The device of claim 1, wherein the planar body is formed as a stack of plates.

4. The device of claim 3, wherein the plates are formed of spring steel.

5. The device of claim 3, wherein the stack of plates includes at least five plates.

6. The device of claim 1, wherein the plurality of elastically deformable members includes four elastically deformable members.

7. The device of claim 1, wherein the mounting portion of the rim includes a plurality of apertures and a plurality of fasteners extending through the apertures and rotationally fixing the planar body to one of the flywheel and the driven member.

8. The device of claim 1, wherein the planar body is formed as a stack of plates, each of said plates being unitarily formed with a hub portion, a rim portion and a plurality of elastically deformable member portions.

9. A torsionally dampened powertrain for a motor vehicle comprising:

an engine having a crankshaft and a flywheel connected to the crankshaft;

a transmission assembly outputting torque to drive members of the motor vehicle; and a torsional detuner disposed between the engine and the transmission assembly for dampening vibrations developed in the engine and being transferred to the transmission assembly, the detuner including a planar body having a central hub, a peripheral rim, a plurality of guide pins disposed in the planar body, the guide pins configured to aligning the planar body with the flywheel, and a plurality of elastically deformable members connecting the central hub to the peripheral rim, the hub and the rim each having mounting portions configured such that the mounting portion of the hub is mounted to the transmission assembly and the mounting portion of the rim is mounted to the flywheel, the mounting portion of the hub having a yoke mounted in a central aperture in the hub, the yoke being configured to connect with the transmission assembly, whereby vibrations developed in the engine are dampened by the relative rotation between the hub and rim.

10. The device of claim 9, wherein the elastically deformable members extend from the hub to the rim in an outwardly radial spiral.

11. The device of claim 9, wherein the planar body is formed as a stack of plates.

12. The device of claim 11, wherein the plates are formed of spring steel.

13. The device of claim 11, wherein the stack of plates includes at least five plates.

* * * * *